Patented Sept. 3, 1940

2,213,805

UNITED STATES PATENT OFFICE 2,213,805

DIPHENYLSULPHONE DERIVATIVES AND MANUFACTURE THEREOF

Paūl Pöhls and Fritz Mietzsch, Wuppertal-Elberfeld, Germany, assignors to Winthrop Chemical Company, Inc., New York, N. Y., a corporation of New York No Drawing. Application August 9, 1939, Serial No. 289,185. In Germany August 10, 1938

8 Claims. (Cl. 260—507)

This invention relates to diphenylsulphone derivatives and to a process of manufacturing the same.

It is known that the 4,4'-diaminodiphenylsulphone which has the formula

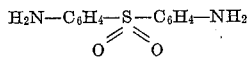

and certain derivatives thereof have a favorable influence on the streptococci infections of the warm-blooded individuals. These compounds are not suitable for injection purposes, since solutions of the mineral acid salts of the 4,4'-diaminodiphenylsulphone, because of the low basicity of the base, react acid to congo and, therefore, cause necrosis when injected subcutaneously. Besides the base itself causes a strong formation of methaemoglobin. By acylation of the aromatic amino groups derivatives of the 4,4'-diaminodiphenylsulphone were obtained, the methaemoglobin-forming activity of which sometimes is reduced; but these compounds are practically insoluble in water, so that they can be injected only in suspension.

According to the present invention colorless products which in the form of their salts, particularly in the form of alkali metal salts, are soluble in water with neutral reaction and therefore are suitable for injection purposes are obtained by the manufacture of 4,4'-bis-(sulphoaryl-carbonamido)-diphenylsulphones, the sulphoaryl radical of which is selected from the group consisting of sulphophenyl, sulphonaphthyl, sulphohydroxyphenyl and sulphohydroxynaphthyl radicals. The said compounds have proved to be highly active against streptococci infections of the warm-blooded individuals. Their salts with organic or inorganic bases which are soluble in water with neutral reaction yield stable, aqueous solutions, which may be used for injection purposes. As salts for instance sodium, ammonium and potassium salts or the diethylamine, ethanolamine, diethanolamine, piperidine, ethylenediamine, piperazine salts and the like come into consideration.

The above described compounds are obtained by causing to react 4,4'-diaminodiphenylsulphone or substitution products thereof, containing at least one hydrogen atom in each of the amino groups, with aromatic carboxylic acid halides being substituted by at least one sulphonic acid group. Another way for obtaining the new compounds consists in converting in 4,4'-diaryl-carbonamido-diphenylsulphones, containing in the aryl radical a substituent capable of being converted into the sulphonic acid group, for instance a mercapto-, sulphohalide- or sulphinic acid group, this substituent according to methods known per se into the sulphonic acid group. The sulphonic acid group may also be introduced directly into the 4,4'-diaryl-carbonamido-diphenylsulphones.

The new compounds may also be obtained from 4,4'-disulphoaryl-carbonamido-diphenylsulphides or -sulphoxides when oxidized according to the usual methods, for instance with hydrogen peroxide or permanganate.

The invention is illustrated by the following examples without being restricted thereto.

Example 1

178.4 grams of benzoylchloride-3-sulphofluoride which has the formula ClOCC$_6$H$_4$SO$_2$F are diluted with 1200 ccs. of acetone. A solution of 99.2 grams of 4,4'-diaminodiphenylsulphone and 64 grams of pyridine dissolved in 600 ccs. of acetone are added drop by drop to this solution. The temperature of the mixture rises to 45° C. After 2½ hours' boiling the precipitate is sucked off, washed with water and dried in the air. The 4,4'-di-(3-sulphofluoride-benzoylamino)-diphenylsulphone of the formula

FO$_2$S.C$_6$H$_4$.CONH.C$_6$H$_4$.SO$_2$.C$_6$H$_4$.NHOC.C$_6$H$_4$.SO$_2$F (164 grams) thus obtained melts at 297° C. while decomposing.

150 grams of 4,4'-di-(3-sulphofluoride-benzoylamino)-diphenylsulphone are dissolved with 500 ccs. of concentrated sodium hydroxide solution (20%) and 500 ccs. of water while stirring for half an hour at 50° C. 117 grams of the disodium salt of 4,4'-di-(3-sulphobenzoylamino)-diphenylsulphone are obtained from the solution by precipitation with 300 grams of sodium chloride. The substance is readily soluble in water.

The benzoylchloride-3-sulphofluoride used is manufactured as follows:

50 grams of sodium fluoride are dissolved in 1200 ccs. of water and 180 grams of benzoic acid-3-sulphochloride are added thereto. The suspension is heated to 45° C. for 3 hours while stirring. The benzoic acid-3-sulphofluoride thus obtained is sucked off, well washed with water and dried at 100° C. 135 grams melting at 148–149° C. are obtained. 135 grams of benzoic acid-3-sulphofluoride are boiled under reflux for 5 hours with 300 ccs. of thionylchloride; thereupon the thionylchloride is evaporated under reduced pressure. The benzoylchloride-3-sulpho-

Example 2

138 grams of the 4,4'-diamino-diphenylsulphone salt of 6-sulpho-2-hydroxynaphthalene-3-carboxylic acid (obtained by reaction of 1 mol of the hydrochloride of 4,4'-diamino-diphenylsulphone with 2 mols of the mono-potassium salt of 6-sulpho-2-hydroxynaphthalene-3-carboxylic acid) of the formula $HO_3S.C_{10}H_5(OH).COOH$ are introduced into 350 grams of anhydrous pyridine while stirring. 32 grams of phosphorus trichloride are added drop by drop to the solution while further stirring, the temperature being maintained at 60–70° C. Thereupon the mixture is boiled still for 10 hours while stirring. After cooling it is neutralized by adding an aqueous sodium carbonate solution and the pyridine removed from the mixture by steam distillation. The distillation residue is an almost clear solution, containing as precipitate only a very small quantity of 4,4'-diaminodiphenylsulphone. The reaction, therefore, takes place practically quantitatively. The filtered solution may be concentrated under reduced pressure and the 4,4'-bis-(6''-sulpho - 2'' - hydroxynaphthalene - 3'' - carbonamido) - diphenylsulphone separated therefrom. The free sulphonic acid which has the formula:

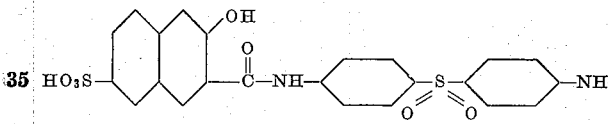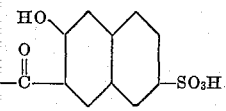

is precipitated in the form of an almost white precipitate being difficultly soluble in water by adding excess hydrochloric acid. The sodium salt of the sulphonic acid can be precipitated by the addition of dilute acetic acid and concentrated sodium chloride solution as an almost white precipitate being readily soluble in water, almost colorless and slightly fluorescent. By the addition of excess sodium hydroxide solution a solution of a polysodium salt is obtained, containing also sodium connected with the hydroxyl groups. This solution shows a strong green fluorescence and differs from the sodium hydroxide solution of the 6-sulpho-2-hydroxynaphthalene-3-carboxylic acid used as starting material by its dark yellow color. The polysodium salt may be separated as a yellow voluminous precipitate by adding a large quantity of excess sodium hydroxide solution.

We claim:

1. A 4.4' - bis - (sulphoaryl - carbonamido) - diphenylsulphone the sulphoaryl radical of which is selected from the group consisting of sulphophenyl and sulphonaphthyl radicals and of the corresponding hydroxylated radicals, which product is soluble in water in the form of its alkali metal salts.

2. A 4.4'-bis-(sulphonaphthyl - carbonamido) - diphenylsulphone, which product is soluble in water in the form of its alkali metal salts.

3. A 4.4' - bis - (sulpho-hydroxynaphthyl - carbonamido)-diphenylsulphone, which product is soluble in water in the form of its alkali metal salts.

4. A 4.4'-bis-(6''-sulpho-2''-hydroxynaphthyl-(3'') - carbonamido) - diphenylsulphone, which product is soluble in water in the form of its alkali metal salts.

5. The process which comprises reacting upon a 4.4'-diaminodiphenylsulphone with a sulphoarylcarboxylic acid halide, the sulphoaryl radical of which is selected from the group consisting of sulphophenyl and sulphonaphthyl radicals and of the corresponding hydroxylated radicals.

6. The process which comprises reacting upon a 4.4'-diaminodiphenylsulphone with a sulphonaphthyl-carboxylic acid halide.

7. The process which comprises reacting upon a 4.4'-diaminodiphenylsulphone with a sulphohydroxynaphthyl carboxylic acid halide.

8. The process which comprises reacting upon 4.4'-diaminodiphenylsulphone with a 6-sulpho-2-hydroxynaphthyl-3-carboxylic acid halide.

PAŪL PÖHLS.
FRITZ MIETZSCH.